(12) United States Patent
Szczepanik et al.

(10) Patent No.: US 10,809,941 B2
(45) Date of Patent: Oct. 20, 2020

(54) MULTI-TIERED STORAGE

(71) Applicant: International Business Machines Corporation, Armonk, NY (US)

(72) Inventors: Grzegorz Piotr Szczepanik, Cracow (PL); Kushal Patel, Pune (IN); Lukasz Jakub Palus, Cracow (PL); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 16/297,956

(22) Filed: Mar. 11, 2019

(65) Prior Publication Data

US 2020/0293219 A1 Sep. 17, 2020

(51) Int. Cl.
*G06F 12/00* (2006.01)
*G06F 3/06* (2006.01)

(52) U.S. Cl.
CPC .......... *G06F 3/0653* (2013.01); *G06F 3/0608* (2013.01); *G06F 3/0641* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 6,237,021 B1 | 5/2001 | Drummond | |
| 7,567,188 B1 | 7/2009 | Anglin et al. | |
| 8,935,493 B1 | 1/2015 | Dolan et al. | |
| 8,996,808 B2 | 3/2015 | Hyde, II et al. | |
| 9,430,368 B1 | 8/2016 | Derbeko et al. | |
| 9,594,514 B1 | 3/2017 | Bono et al. | |
| 2013/0145095 A1 | 6/2013 | McKean et al. | |
| 2013/0318391 A1 | 11/2013 | Kazemi et al. | |
| 2014/0310455 A1 | 10/2014 | Baldwin et al. | |
| 2019/0050148 A1* | 2/2019 | Jain ....................... | G06F 3/0652 |

OTHER PUBLICATIONS

Anonymous, "Method for Enhanced Application Performance During Storage Migrations in Multi-Tier Storage Environment", An IP.com Prior Art Database Technical Disclosure, IP.com No. IPCOM000254599D, IP.com Electronic Publication Date: Jul. 17, 2018, 5 pages.

Anonymous, "Method to Improve Auto-Tiering Process With Enhanced Extent Promotion Mechanism in the Storage System", An IP.com Prior Art Database Technical Disclosure, IP.com No. IPCOM000254786D, IP.com Electronic Publication Date: Aug. 1, 2018, 8 pages.

Mell et al., "The NIST Definition of Cloud Computing", Recommendations of the National Institute of Standards and Technology, Sep. 2011, 7 pages.

* cited by examiner

*Primary Examiner* — John A Lane
(74) *Attorney, Agent, or Firm* — Donald J. O'Brien

(57) ABSTRACT

Embodiments are disclosed for managing a multi-tiered storage system. The techniques include generating a heat map for numerous data extents in the multi-tier storage system. The techniques also include generating a queue comprising a plurality of candidates of the data extents. The queue is generated by determining deduplication link counts associated with the candidates, sorting the candidates based on the heat map, and sorting the heat map sorted candidates based on the link counts. The techniques also include moving one or more of the candidates from the first tier of the multi-tier storage system to the second tier of the multi-tier storage system based on the queue.

20 Claims, 10 Drawing Sheets

MULTI-TIERED STORAGE

BACKGROUND

The present invention relates to storage systems, and more specifically, to multi-tiered storage system data deduplication.

Storage systems are systems used by computers to perform the reading and writing of data. Data may be read from, and written to, different types of storage devices, e.g., hard disk drives and solid-state drives. Each type of storage device offers different advantages and challenges in terms of access, latency, and other criteria.

SUMMARY

Embodiments are disclosed for managing a multi-tiered storage system. The techniques include generating a heat map for numerous data extents in the multi-tier storage system. The techniques also include generating a queue comprising a plurality of candidates of the data extents. The queue is generated by determining deduplication link counts associated with the candidates, sorting the candidates based on the heat map, and sorting the heat map sorted candidates based on the deduplication link counts. The techniques also include moving one or more of the candidates from the first tier of the multi-tier storage system to the second tier of the multi-tier storage system based on the queue.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
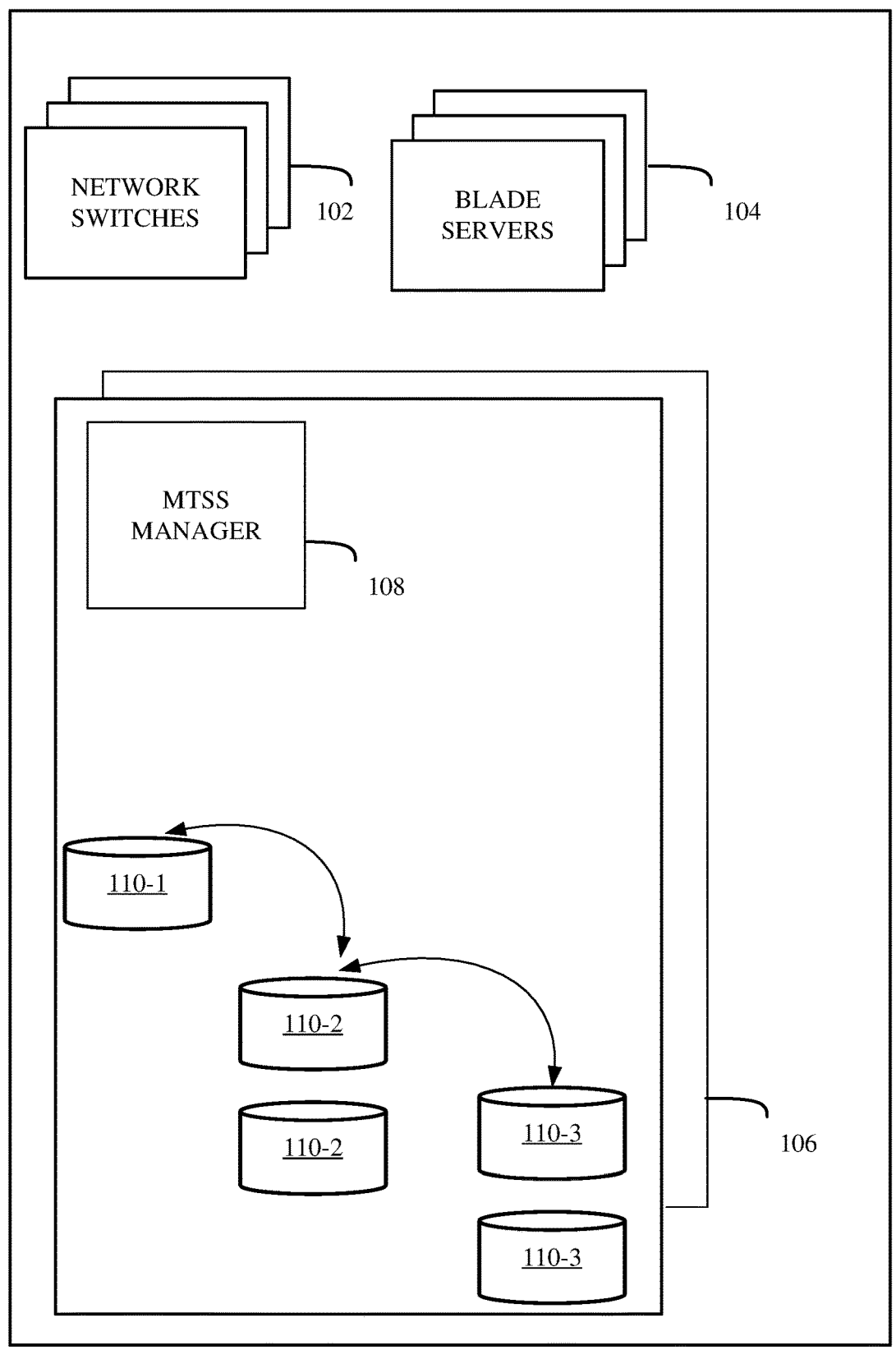
FIG. 1 illustrates a block diagram of an example system for multi-tiered storage, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Modern storage controllers can provide a mechanism of multi-tiered storage where data is stored on various types of storage devices based on criteria that includes access, frequency of use, security, data recovery, and the like. In multi-tiered storage system, there can be at least two tiers available in which one tier provides a relatively fast response time with respect to the other tier, which can have relatively slower response times. In multi-tiered storage systems, data that is frequently accessed by an application that is response-time sensitive might be stored on solid state drives (SSD), which can provide relatively fast response times. Other data that is infrequently accessed and for which a higher response time is more tolerable might be stored on high capacity 7.2 kilobyte (K) revolutions per minute (RPM) drives, which can provide a greater amount of storage than SSDs, but with relatively slower response times. The cost per gigabyte of storage generally increases as access speeds increase. Thus, as the storage on faster devices can be more expensive than storage on slower devices, it can be useful to manage the data to be served from the faster tier more efficiently.

In current systems, the frequency of access can be determined based on the number of times that a specific segment of data, i.e., a data extent, is accessed. However, data deduplication provides an additional criterion for prioritizing placement that can improve the efficiency of computer systems with multi-tiered storage. Data deduplication is a data reduction technique that can reduce the amount of redundant data in a storage system by replacing duplicated data with links that point to a location where a single copy of the data is stored. In this way, the storage capacity of a storage system can be increased because a link can take up less storage space than the data extent to which the link is pointing. Further, the more links that a copy of deduplicated data has, the more likely the deduplicated data is to be accessed. Thus, by prioritizing the placement of deduplicated data with multiple links into faster tiers of storage over data with fewer links, the efficiency of multi-tiered storage systems can be improved.

Accordingly, in embodiments of the present disclosure, multi-tiered storage systems can prioritize placement of data extents on storage devices with relatively faster response times based on the frequency of access and the number of links to deduplicated data extents. In this way, the efficiency provided by multi-tiered storage systems can be improved because deduplicated data that is more likely to be accessed than other data is placed on storage devices with faster response times.

Referring now to FIG. 1, illustrated is a block diagram of an example system 100 for multi-tiered storage, in accordance with embodiments of the present disclosure. The system 100 can be any server computing device, such as, a blade server, rack server, a cloud server, etc. Further, the system 100 can provide server hosting on shared, virtual, clustered (e.g., Network Attached Clustered Storage Systems), and cloud systems, and the like. In this way, the system 100 can provide various types of server applications, including web servers, application servers, file servers, print servers, database servers, media and mail servers, and the like.

In some embodiments, the system 100 includes a frame that houses numerous modules. The term, "frame," can mean housing, cabinet, rack, or the like and provides the structural enclosure and/or support (e.g., along with various module chassis) for each of the modules. As referenced herein, the term, "module," can mean a server computing device node, compartment, input-output (I/O) drawer, book, blade, instance (e.g., grouped components), and the like. In this example, the system 100 houses modules that are network switches 102, blade servers 104, and storage blades 106. The network switches 102 can be switching hubs, bridging hubs, media access control bridges, or any computer networking devices that connect devices on a computer network by using packet switching to receive, process, and forward data. The blade servers 104 can be server computers with a modular design that reduces the use of physical space and energy, while maintaining enough functional components to be considered a computer.

In embodiments of the disclosure, the storage blades 104 can include multiple types of storage devices, such as flash drives, SSDs, HDDs, and the like. Each of the storage devices can have different speed and other performance characteristics. Hence, to take advantage of the varying characteristics of the different storage device types, the system 100 can use tiering technology whereby the storage devices with faster speeds are classified in higher tiers, and the storage devices with the slower speeds are classified in the lower tiers. Further, the higher tier storage devices can store data that is more frequently accessed, and the lower tier storage devices can store data that is less frequently accessed. In this way, the most frequent data accesses incur the lower cost in terms of latency, thus improving the performance of the system 100. Accordingly, the storage blades 106 can include a multi-tiered storage system (MTSS) manager 108 that places more frequently accessed data extents in higher tiers and less frequently accessed data extents in lower tiers. In accordance with embodiments of the present disclosure, the frequency of access of a data extent can be determined based on the count of actual accesses, i.e, READs and WRITEs, and the number of deduplication links associated with the data extent. In this way, active applications are not delayed by waiting to complete READ and WRITE operations of frequently accessed data extents because they are being stored in storage devices with slower access speeds. For example, the storage blades can include tier-1 storage device 110-1, tier-2 storage devices 110-2, and tier-3 storage devices 110-3. The lower tier numbers can represent the higher tiers, i.e., the storage devices 110 with faster access speeds. Thus, tier-1 storage device 110-1 can have the fastest access speeds of the storage devices 110 and can be, for example, a write-intensive enterprise serial attached SCSI (SAS) SSD with a 400 gigabyte (GB) single-level cell. The tier-2 storage device 110-2 can have the next fastest access speeds of the storage devices 110, and can be, for example, a read intensive enterprise SAS SSD with a 1.6 terabyte (TB) multi-level cell. The tier-3 storage device 110-3 can be a low tier device, having the slowest access speeds of the storage devices 110. For example, the tier-3 storage devices 110-3 can include HDDs with access speeds of 15 kilobytes (K), 10K, and 7.2K. Additionally, the storage blades 106 can incorporate data deduplication techniques, which replace copies of data extents with links to a single copy of the data extent. The arrows between the storage devices 110 indicate that the MTSS manager 108 moves data extents between the different storage devices 110, i.e., different tiers, to accommodate more efficient application performance. Accordingly, in embodiments of the present disclosure, the multi-tiered storage system 108 can move data extents across tiers based on how frequently the data extent is accessed and based on how many deduplication links point to the data extent. For example, as a data extent in the tier-1 storage device 110-1 becomes less frequently accessed and loses deduplication links, the MTSS manager 108 can demote the data extent to the tier-2 storage devices 110-2. Similarly, data extents in the tier-2 storage devices 110-2 can be promoted to the tier-1 storage devices 110-1 as the data extents become more frequently accessed and gain more deduplication links. Further, the data extents in the tier-2 storage devices 110-2 can be promoted to tier-1 or demoted to tier-3 as access frequency and deduplication links change.

Deduplication can be managed at multiple levels of a computing system. For example, in storage-level deduplication, the storage system can determine what data blocks in storage are deduplicated, replace extra copies of data with deduplication links, and track how many links there are to each block of deduplicated data. In application-level deduplication, the application can perform these techniques. The storage system and application can deduplicate data blocks, data extents, and data files. However, when the application is managing deduplication, the information about the deduplications may not be accessible to the storage system. Accordingly, the embodiments of the present disclosure provide in-bound and out-of-bound application program interfaces (APIs) to determine application level deduplication links and update the link counters in queues that are used to determine what data extents are promoted and demoted across tiers.

Further, there can be multiple levels of deduplication. For example, if an Application, A, is installed over a hypervisor, B, both A and B can be using external deduplication mechanisms. Accordingly, embodiments of the present disclosure can provide external or internal application level data deduplication awareness to the MTSS manager 108, such that the deduplication link counts can be used to decide which data extents to promote when there is a limited space available on the faster storage tiers. Further, the MTSS manager 108 can also use this data deduplication awareness to decide which data extents to demote in order to free up space on the faster storage tiers. Additionally, the MTSS manager 108 can use an in-bound or out-of-bound API in order to provide application-level data deduplication information to a storage subsystem.

Figure 2:
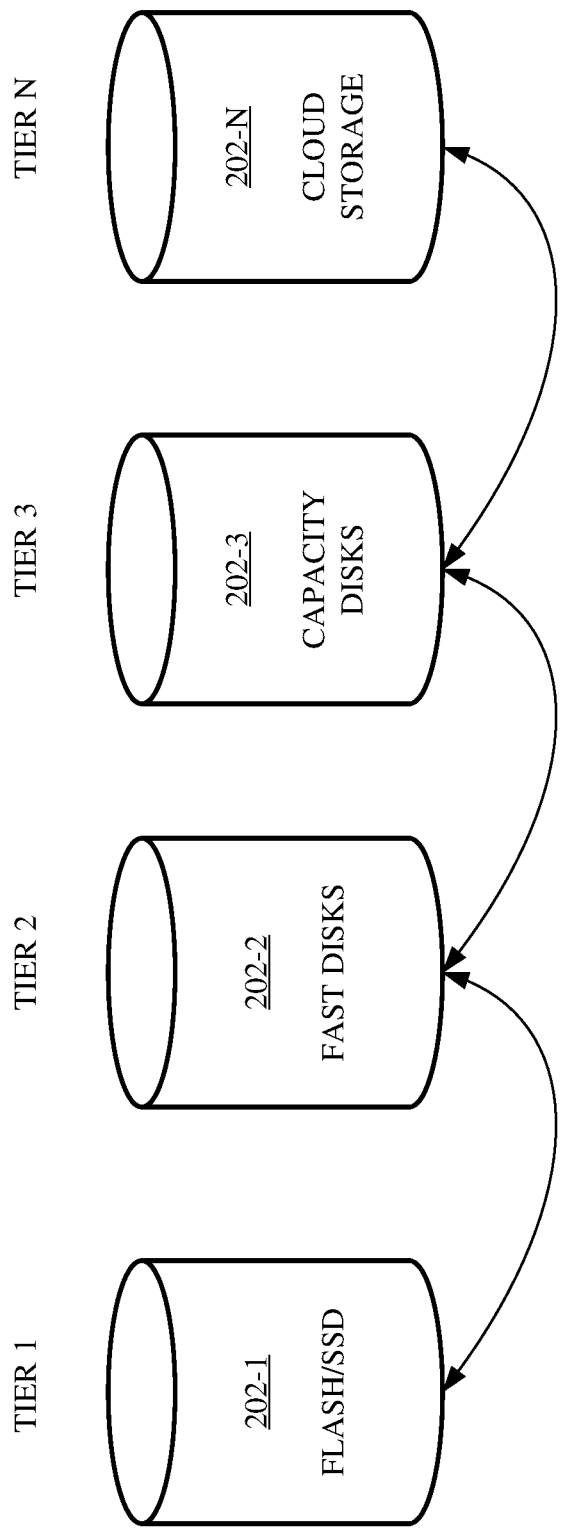
FIG. 2 illustrates a block diagram of an example of multi-tiered storage devices, in accordance with embodiments of the present disclosure.

Referring now to FIG. 2, illustrated is a block diagram of an example of multi-tiered storage devices 202, in accordance with embodiments of the present disclosure. The multi-tiered storage devices 202 include storage devices 202-1 through 202-N, i.e., tiers 1 through N. The tier-1 storage device 202-1 can include flash memory or SSD, which can provide the fastest access of the storage devices 202. Flash memory is a non-volatile storage medium that can be electrically erased and reprogrammed. The tier-2 storage device 202-2 can include fast disks, which can provide the next fastest access times of the storage devices 202. Fast disks can include HDDs that are configured for relatively high access speeds. The tier-3 storage device 202-3 can include capacity disks, which can provide the next fastest access times of the storage devices 202. Capacity disks can be HDDs that are configured to hold relatively large amounts of data. Capacity disks provide the convenience of large amounts of storage, but at the cost of lower access speeds than other storage devices, such as fast disks and flash memory. The storage devices 202 also include tier-N storage device 202-N. The tier-N storage device 202-N can be a tier-4 storage device, or some lower level tier. In embodiments of the present disclosure, there is no upper limit to the number of tiers that can be employed in multi-tiered storage. In this example, the tier-N storage device 202-N can be cloud storage. Cloud storage can provide larger capacity storage than a capacity disk. However, access to cloud storage is slowed by the access method, which includes communication over a wide area network (WAN), such as the Internet. In contrast, the storage devices 202-1 through 202-3 can be accessed over a local interconnect or network fabric, which can provide higher access speeds than a WAN.

The arrows between the storage devices indicate the movement of data extents across tiers as the frequency of access and the number of deduplication links changes. The frequency of these accesses can be recorded in a heat map. A heat map can be a table that identifies the number of accesses to each block of data in the data extents of the multi-tiered storage devices 202. A block of data can represent one portion of data in a data extent. Data extents can include several blocks, and the blocks can range in size from megabytes (MBs) to gigabytes (GBs). In some embodiments, the heat map can record the frequency of access of a data extent as being equal to the average number of accesses across all the blocks of the data extent. The number of accesses can thus represent the "heat" of a data extent. Accordingly, the MTSS manager 108 can move the hotter data extents to the faster tiers, e.g., tier-1 and tier-2 storage devices 202-1, 202-2. In contrast, the MTSS manager 108 can move the colder data extents to the slower tiers, e.g., tier-3 and tier-N storage devices 202-3, 202-N. Further, in embodiments of the present disclosure, when two data extents have the same number of accesses, the MTSS manager 108 can prioritize placement in the faster tiers for the deduplicated data extents with a greater number of links over deduplicated data extents with fewer links, and over non-duplicated data. Similarly, when two data extents have the same number of accesses, the MTSS manager 108 can prioritize placement in the slower tiers for non-duplicated data and deduplicated data extents with fewer numbers of links.

Figure 3A:
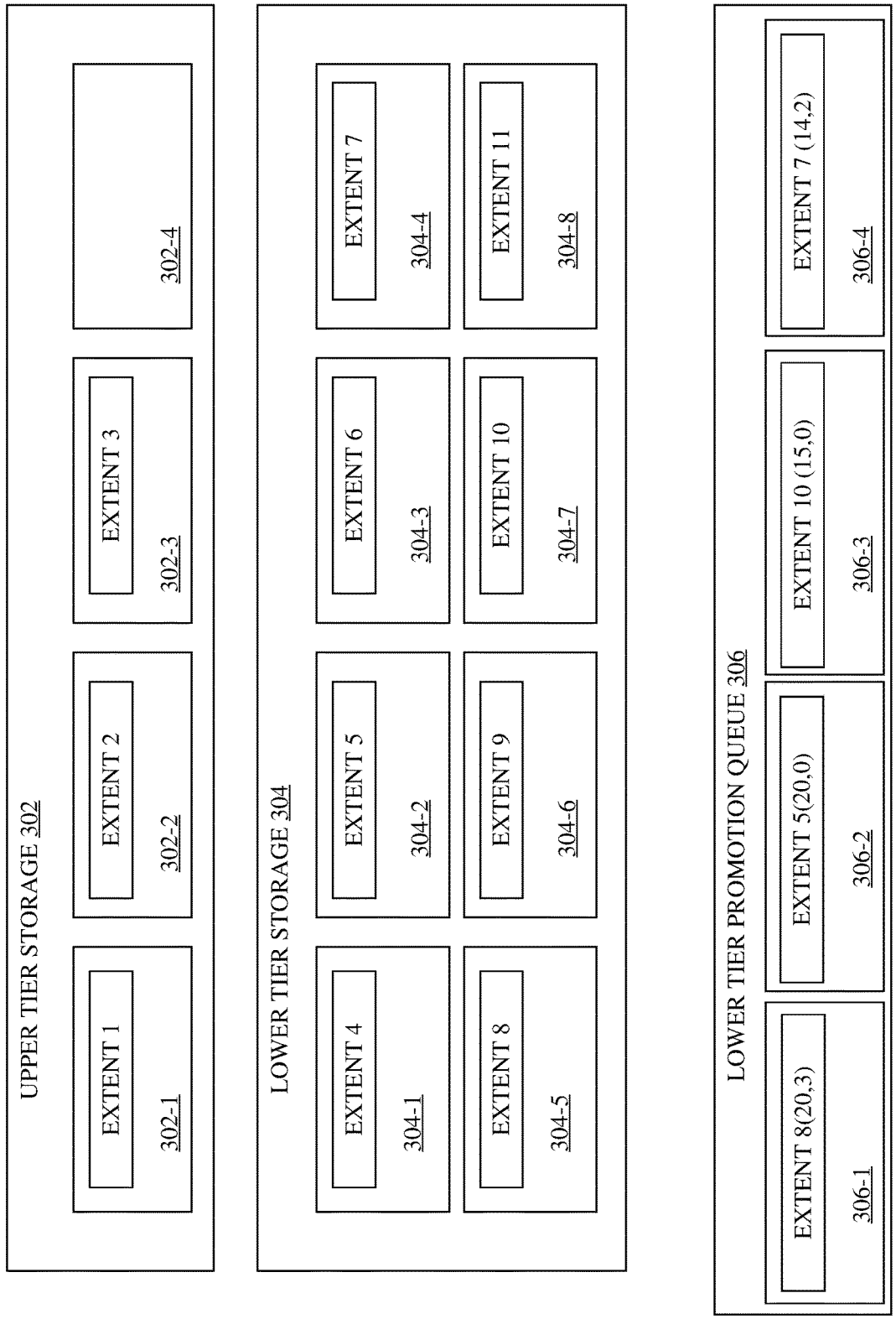
FIG. 3A illustrates a block diagram of an example system for multi-tiered storage before promotion, in accordance with embodiments of the present disclosure.

Referring now to FIG. 3A, illustrated is a block diagram of example system 300 for multi-tiered storage before promotion, in accordance with embodiments of the present disclosure. The system 300 includes upper tier storage 302, lower tier storage 304, and lower tier promotion queue 306. The upper tier storage 302 represents the data extents that are stored in the upper tier of multi-tiered storage. The upper tier storage 302 includes 4 slots 302-1 through 302-4, which can represent the available spaces in the upper tier storage 302 for storing data extents. As shown, slots 302-1 through 302-3 contain data extents 1 through 3, respectively. Further, slot 302-4 is not occupied. Thus, slot 302-4 is available for a data extent to be promoted from the lower tier storage 304.

The lower tier storage 304 represents the data extents that are stored in the lower tier of multi-tiered storage. The lower tier storage 304 includes 8 slots 304-1 through 304-8, which can represent the available spaces in the lower tier storage 304 for storing data extents. As shown, slots 304-1 through 304-8 contain data extents 4 through 11, respectively.

The lower tier promotion queue 306 includes the data extents in the lower tier storage 304 that are candidates for promotion to the upper tier storage 302. The lower tier promotion queue 306 includes slots 306-1 through 306-4, which contain the four highest priority candidate data extents for promotion. The lower tier promotion queue 306 can represent all the candidates for promotion to the upper tier storage 302. Thus, as there are four slots in the upper tier storage 302, the lower tier promotion queue 306 also contains four slots. The priority of a candidate data extent can be represented by the slot number. Thus, the highest priority candidate data extent is in slot 306-1, and the lowest priority is in slot 306-4. In the promotion queue 306, the four highest priority candidate data extents are shown with their heat values and deduplication link counts in parentheses. In embodiments of the disclosure, the MTSS manager 108 can order the lower tier promotion queue 306 based on the heat value and then the number of deduplication links. Thus, if two data extents have the same heat value, the order of the data extents in the lower tier promotion queue is determined by the number of deduplication links. As such, data extent 8 is in the first slot 306-1 of the lower tier promotion queue 306 with a heat value of 20 and a deduplication link count of 3. Data extent 5 has the same heat value as data extent 8. However, data extent 5 has zero deduplication links. Thus, data extent 5 is second to data extent 8 in the lower tier promotion queue 306, in slot 306-2. As data extent 8 has more deduplication links than data extent 5, there can be a higher probability that data extent 8 is being accessed by more host applications than data extent 5. Also, because the deduplication mechanism is situated at the upper layer of the I/O processing stack, the heat value for data extents with deduplicated links can be not reflect all the deduplicated data extent's accesses. For, when any I/O comes to the storage system, the storage system checks for the deduplication first. If, after checking for deduplication, the data block is determined not to be deduplicated, or not present in the system, then the actual READ or WRITE operation to the disks is performed. However, if the data block is deduplicated, the I/O operation is performed on the deduplicated copy of the data. Since the heat map is updated by tracking actual disk I/O operations, the I/O operations on the deduplicated data are not included in the heat map updates. Thus, according to embodiments of the present disclosure, the MTSS manager 108 can promote the data extent having more deduplication links over data extents with fewer deduplication links when the heat values are the same. Prioritizing data extents for promotion in this way can improve the performance of computing systems with multi-tiered storage.

Data extent 10 is next in slot 306-3 with a heat value of 15 and zero deduplication links. Data extent 7 has a heat value of 14, which is lower than the heat value of data extent 10. Thus, even though data extent 7 has more deduplication links than data extent 10, data extent 7 is in slot 306-4 because the heat value of data extent 7 is lower than the heat value of data extent 10.

As stated previously, the upper tier storage 302 has one open slot 302-4 available for promoting a data extent from the lower tier storage 304. Thus, because data extent 8 is in the first slot 306-1 of the lower tier promotion queue 306, the MTSS manager 108 can move data extent 8 from slot 304-5 of the lower tier storage 304 to slot 302-4 of the upper tier storage 302.

Figure 3B:
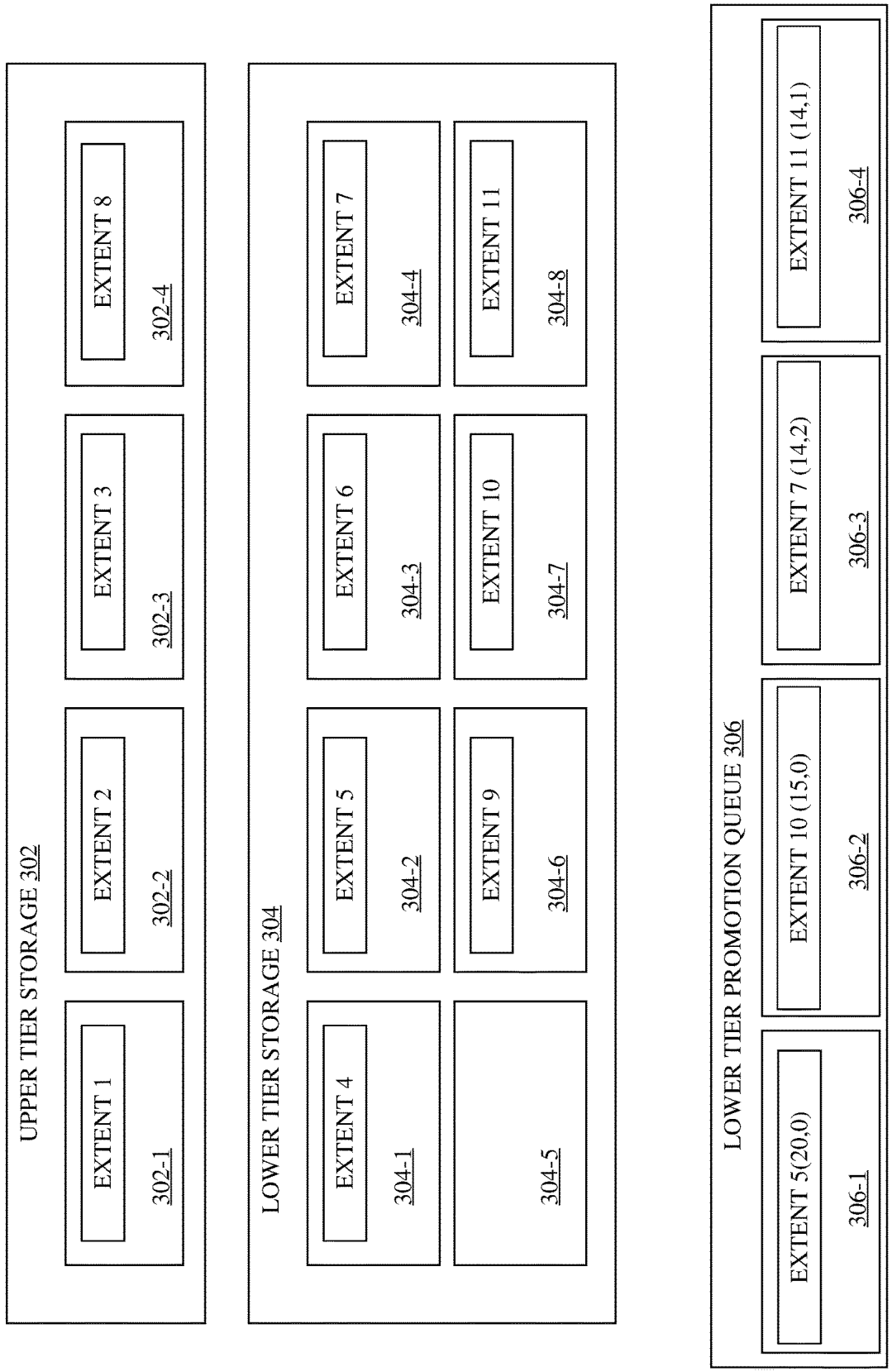
FIG. 3B illustrates a block diagram of an example system for multi-tiered storage after promotion, in accordance with embodiments of the present disclosure.

Referring now to FIG. 3B, illustrated is a block diagram of example system 300 for multi-tiered storage after promotion, in accordance with embodiments of the present disclosure. The system 300 includes upper tier storage 302, lower tier storage 304, and lower tier promotion queue 306. As shown, the MTSS manager 108 has promoted data extent 8 from slot 304-5 of the lower tier storage 304 to slot 302-4 of the upper tier storage 302. Thus, slot 304-5 is empty, and the lower tier promotion queue 306 is updated to reflect the four highest candidate data extents for promotion. The MTSS manager 108 moves data extents 5, 10, and 7 up one slot each, and places data extent 11 in slot 306-4. Data extent 11 has the same heat value as data extent 7. However, data extent 7 has 2 deduplication links, one more than data extent 11. Thus, data extent 11 is in a lower slot position in the lower tier promotion queue than data extent 7.

While FIGS. 3A and 3B represent an example of promotion, the same logic applies to the demotion of data extents. Thus, just as there is a lower tier promotion queue 306 for promotion from the lower tier storage 304 to the upper tier storage 302, there can also be an upper tier demotion queue (not shown). The MTSS manager 108 can use the upper tier demotion queue to demote cold data from the upper tier storage 302 to the lower tier storage 304. However, in contrast to the lower tier promotion queue 306 prioritizing high heat values and deduplication link counts for promotion, the upper tier demotion queue can prioritize low heat values and deduplication link counts for demotion. Similarly, if the example system 300 includes lower storage tiers than lower tier storage 304, the system 300 can also include a lower tier demotion queue (not shown) which can be ordered in accordance with the techniques described above for the upper tier demotion queue.

Figure 4:
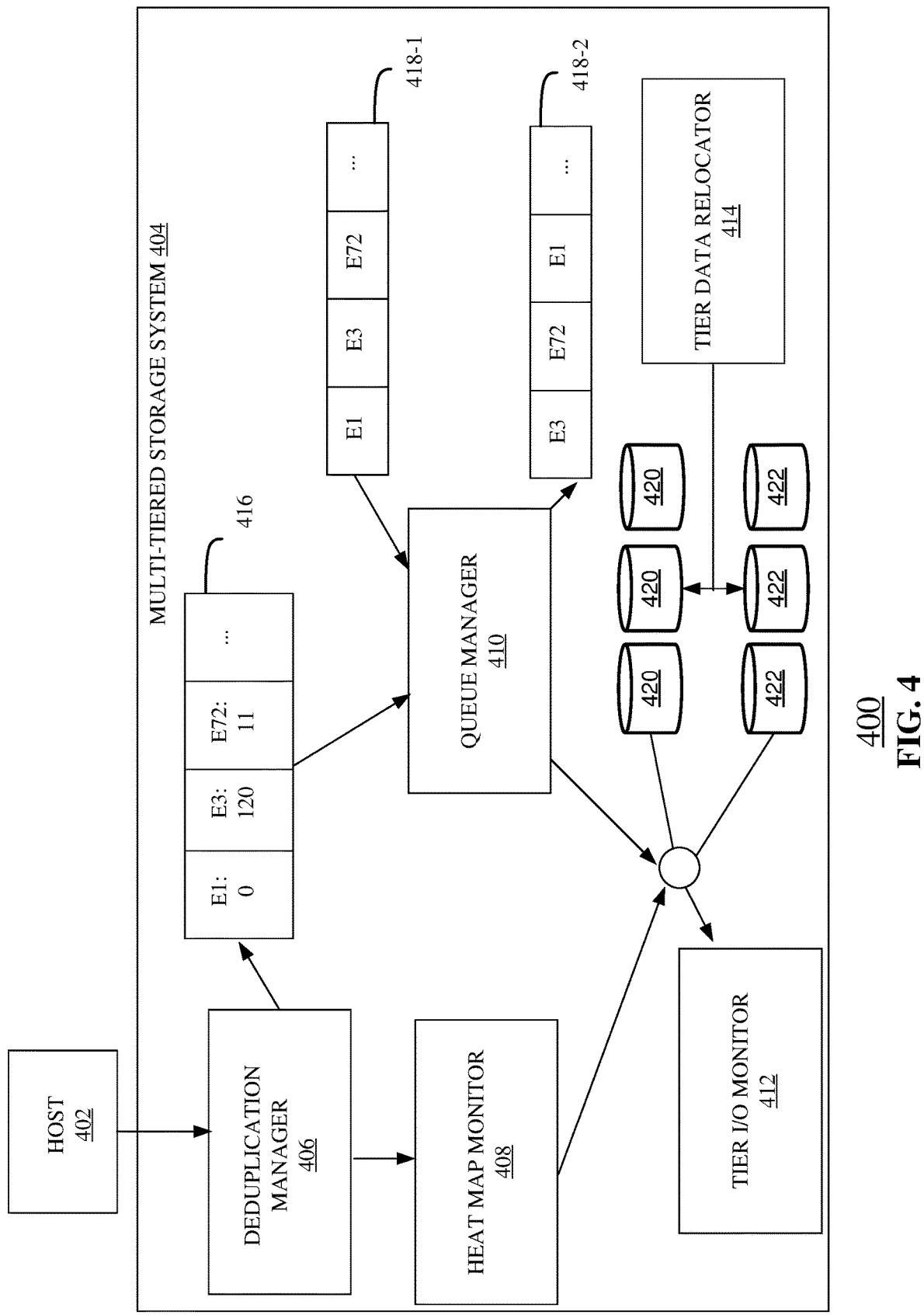
FIG. 4 illustrates a block diagram of an example system for multi-tiered storage, in accordance with embodiments of the present disclosure.

Referring now to FIG. 4, illustrated is a block diagram of an example system 400 for multi-tiered storage, in accordance with embodiments of the present disclosure. The system 400 includes a host 402 and a multi-tiered storage system 404. The host 402 can be a compute node or a virtual machine that is executing applications. The applications executing on the host 402 can use deduplicated data. In the system 400, the host 402 can perform application-level deduplication. With application-level deduplication, access to the information about how many deduplicated links a data extent has can be limited to the host 402. Thus, in embodiments of the present disclosure, the host 402 can provide an application program interface (API) for use to determine the number of deduplicated data links a specific data extent has. Additionally, the API can provide and address translation mapping for upper level deduplication. Upper level deduplication refers to a scenario where the deduplicated data is accessed by the application with relative addresses, which can be useful for the program to access the deduplicated data but may not be useful to the storage system for this purpose. In such a scenario, the API can provide a translation of the relative memory address to an absolute memory address that is meaningful to the storage system.

The multi-tiered storage system 404 can be a collection of software, data structures, and storage devices that are used to store data in multiple tiers of storage devices. More specifically, the multi-tiered storage system 404 can include a deduplication manager 406, a heat map monitor 408, a queue manager 410, a tier I/O monitor 412, a tier data relocator 414, an extent-wise deduplication links table 416, extent promotion queues 418, upper tier storage devices 420, and lower tier storage devices 422. The deduplication manager 406 can use the API for the host 402 to build the extent-wise deduplication links table 416, which contains the number of deduplication links for all the data extents in the upper tier storage devices 420 and lower tier storage devices. In this example, the extent-wise deduplication links table 416 includes deduplication links counts of 0, 120, and 11 for data extents E1, E3, and E72, respectively. The arrow from the host 402 to the deduplication manager 406 indicates that the deduplication link information is provided from the host 402 to the deduplication manager 406. The heat map monitor 408 can interface with the tier I/O monitor 412 to determine the number of accesses to all the data extents in the upper tier storage devices 420 and the lower tier storage devices 422. More specifically, the tier I/O monitor 412 can be a daemon that tracks the accesses of all the data extents in the upper tier storage devices 420 and the lower tier storage devices 422. A daemon can be a computer program that runs as a background process. The heat map monitor 408 can thus generate a heat map for all the data extents based on the access information provided by the tier I/O monitor 412. The heat map monitor 408 is creating a mapping of data extents to access counts and embodiments of the present disclosure incorporate deduplication awareness while managing promotion and demotion queues. The queue manager 410 can be driven by the heat map monitor 408. Hence, the queue manager 410 can be aware of deduplication information. Thus, a linking between the heat map monitor 408, queue manager 410, and tier I/O monitor 412 is shown with arrows to, and from, a common circle. The queue manager 410 can use the heat map generated by the heat map monitor 408 to generate an initial promotion queue 418-1. The initial promotion queue 418-1 can list the data extents from the lower tier storage devices 422 with the greatest number of accesses according to the heat map. The initial promotion queue 418-1 can be sorted based on accesses, meaning the data extent with the highest heat value, i.e., access count, is placed at the beginning of the initial promotion queue. As shown, the initial promotion queue 418-1 includes data extents E1, E3, and E72. Further, the queue manager 410 can generate an updated promotion queue 418-2 based on the initial promotion queue 418-1 and the extent-wise deduplication links table 416. In this example, the data extents E1, E3, and E72 can have the same heat value. Thus, the updated promotion queue 418-2 can be further sorted based on the deduplication link counts for the data extents. As shown, the deduplication links count for data extents E1, E3, and E72 are 0, 120, and 11, respectively. Thus, the updated promotion queue 418-2 sorts the data extents in the following order: E3, E72, and E1. The tier data relocator 414 can perform the promotions from the lower tier storage devices 422 to the upper tier storage devices 420. As such, as data extent slots become available in the upper tier storage devices 420, the tier data relocator 414 can promote the data extents to the upper tier storage devices 420 in the order indicated by the updated promotion queue 418-2: E3, E72, and E1.

Figure 5:
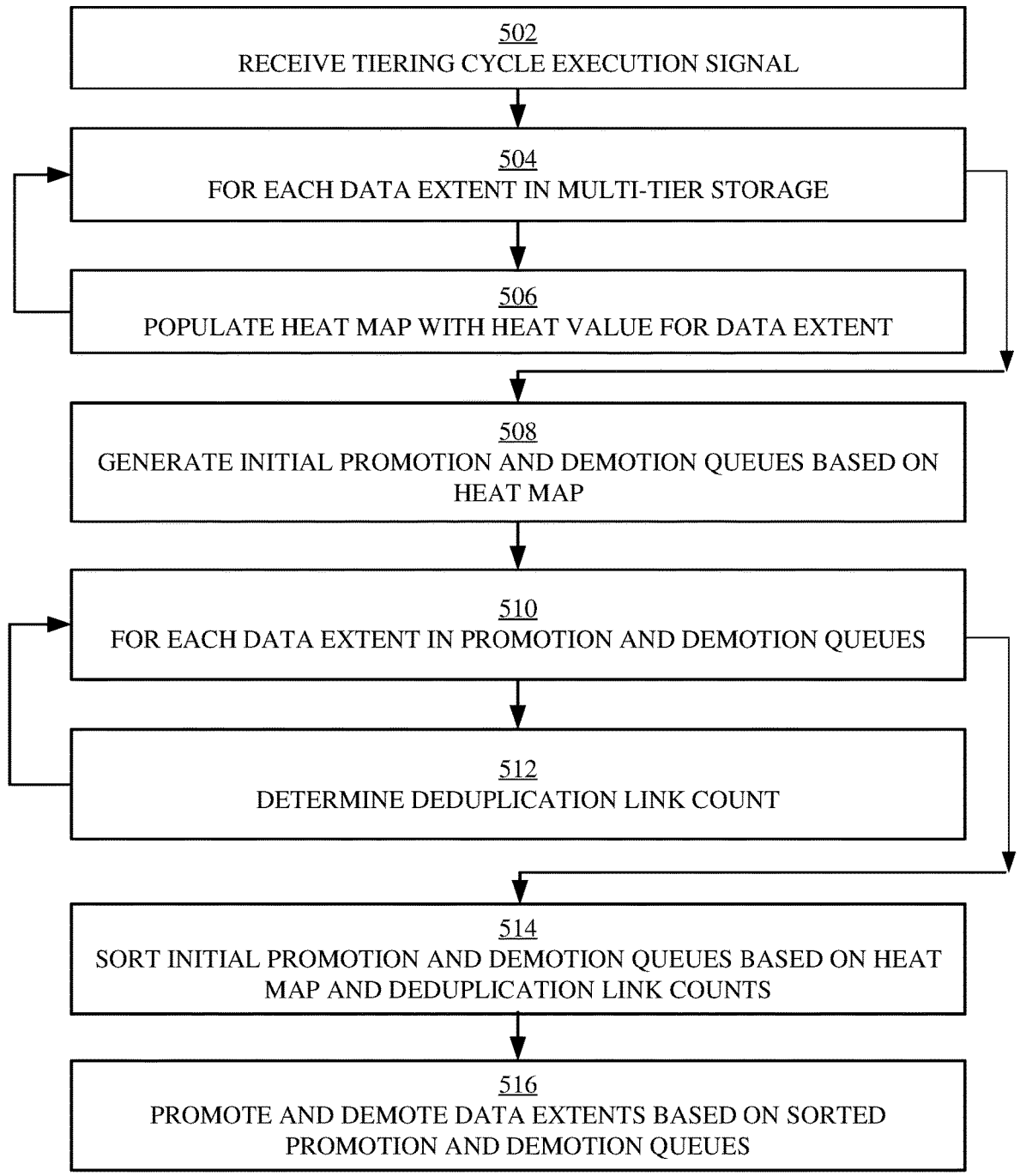
FIG. 5 illustrates a flowchart of an example method for multi-tiered storage, in accordance with embodiments of the present disclosure.

Referring now to FIG. 5, illustrated is a flowchart of an example method 500 for multi-tiered storage, in accordance with embodiments of the present disclosure. The method 500 can be performed by an MTSS manager, such as the MTSS manager 108 described with respect to FIG. 1. At block 502, the MTSS manager 108 can receive a tiering cycle execution signal. The tiering cycle execution signal can indicate that it is time to update the placement of the data extents on the storage tiers. The tiering cycle execution signal can be scheduled to occur on a periodic basis, such as every 24 hours. Alternatively, the tiering cycle execution signal can occur on demand. In other words, a user can invoke the tiering cycle execution signal at a predetermined time.

Blocks 504 through 506 can be executed for each data extent in all the tiers of the multi-tiered storage devices. At block 506, the MTSS manager 108 can populate a heat map with the heat value for each data extent. The heat value can represent the average number of accesses of all the blocks within a data extent since the last tiering cycle execution signal occurred.

At block 508, the MTSS manager 108 can generate initial promotion and demotion queues based on the populated heat map. In accordance with embodiments of the present disclosure, the top tier storage device can have a demotion queue, the bottom tier storage device can have a promotion queue, and intermediate tier storage devices can have both a promotion and a demotion queue. The initial promotion and demotion queues can be sorted based on the heat values for the data extents in each of the queues.

Blocks 510 through 512 can be executed for each data extent in the initial promotion and demotion queues. At block 512, the MTSS manager 108 can determine the deduplication link count for each of the data extents. According to embodiments of the present disclosure, the deduplication link counts can be determined by using an API. If the deduplication is managed at the application level, an API for a host of the application can be used. Alternatively, an API for a storage controller can be used.

At block 514, the MTSS manager 108 can further sort the initial promotion and demotion queues based on the deduplication link counts. In this way, when more than one data extent has the same heat value, the MTSS manager 108 can determine the positions in the update queue based on the deduplication link counts. Thus, data deduplication link counts can be used to prioritize faster storage tiers for data extents that are likely to be more frequently accessed.

At block 516, the MTSS manager 108 can promote and demote data extents across the storage tiers based on the updated promotion and demotion queues. Thus, as data extents are demoted from faster storage tiers, slots can open in these faster storage tiers for the promotion of data extents from slower storage tiers. However, in an alternative embodiment, the MTSS manager 108 can receive a predetermined data extent selection for promotion or demotion. In such an embodiment, the predetermined data extent can be promoted or demoted instead of the data extent at the top of the sorted promotion or demotion queue.

According to embodiments of the present disclosure, the method 500 can provide a mechanism by which a multi-tiered storage system can be aware of application-level deduplication. In this way, the method 500 can provide better system performance because the unequal deduplication workload is being considered when the MTSS manager 108 is making tiering decisions. Further, the method 500 can provide awareness of block level deduplication. Accordingly, the data extents with deduplicated blocks can be prioritized if other blocks have the same heat value during data extent promotion to faster tier storage. Additionally, the method 500 can make tiering decisions fairer to a block within a data extent that is experiencing a high deduplicated I/O workload when other blocks in the same data extents are cold, i.e., have low heat values. In current systems, such a block can be left in slower storage tiers because deduplication may not be taken into account. However, according to embodiments of the present disclosure, the consideration of deduplication link counts can lead to the data extent containing such blocks to be promoted to faster storage tiers. Additionally, the method 500 can improve SSD utilization by ensuring that frequently accessed data extents are placed on the SSDs, thus improving overall system performance. Further, the method 500 can be implemented by modifying tiering mechanisms for storage controllers of current systems.

Figure 6:
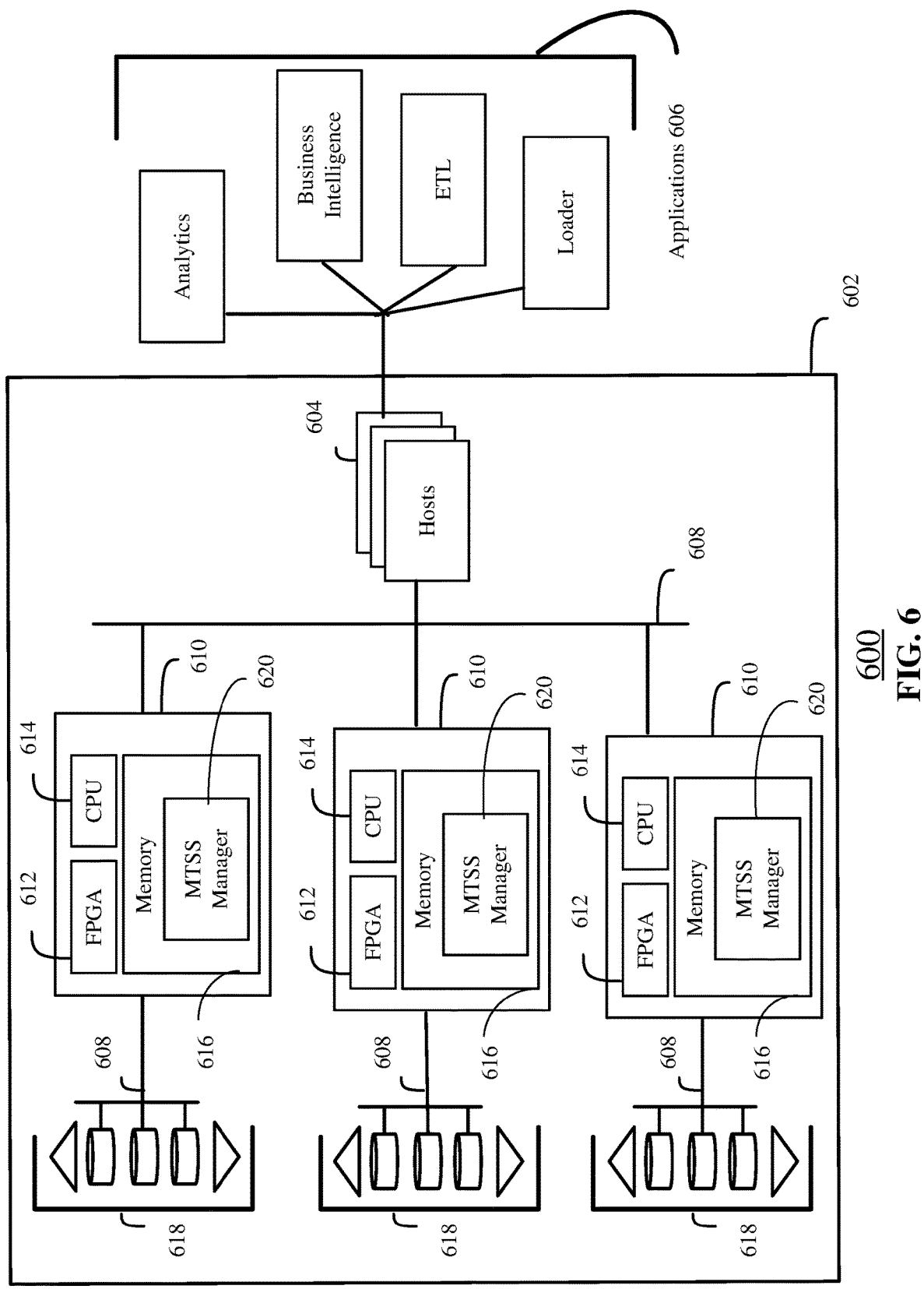
FIG. 6 illustrates a block diagram of an example system for multi-tiered storage, in accordance with embodiments of the present disclosure.

Referring now to FIG. 6, illustrated is a block diagram of an example system 600 for multi-tiered storage, in accordance with embodiments of the present disclosure. The system 600 includes an example data analytics appliance 602. The data analytics appliance 602 can be a computing platform that is configured to provide a cost-effective hardware and software implementation with relative technical simplicity. The data analytics appliance 602 can carry out processing challenges that scale to comparatively large loads. The data analytics appliance 602 can integrate database, processing, and storage in a relatively compact system that is used for analytical processing and designed for flexible growth. In this example, the data analytics appliance 602 includes multiple hosts 604 that execute applications 606. The applications 606 can be business applications that are used to improve the performance of business operations via analyzing generated data. For example, the applications 606 can perform analytics; business intelligence; extract, transform and load (ETL); loader; and like applications. As the applications 606 analyze raw data, the applications 606 can issue numerous input-output (I/O) operations, such as READ operations to collect the data for processing and WRITE operations to save the intermediate data in temporary storage space.

The hosts 604 can be virtual machines connected by a network fabric 608 to shared resources, such as server blades 610 and disk enclosures 618. A virtual machine can be a simulated computer system that uses shared resources to provide the functionality of a physical computer. For example, the server blades 610 include a field programmable gate array (FPGA) 612, a central processing unit 614, and a memory 616. Accordingly, the hosts 604 can be virtual machines that are configured to use some portion of the processing time of the FPGA 612 and CPU 614, and some portion of the memories 616 and disk enclosures 618.

The server blades 610 can be connected over the network fabric 608 to disk enclosures 618. The disk enclosures 618 can be multi-tiered storage systems that include different types of storage devices, such as flash drives, SSDs, and hard disk drives (HDDs). The disk enclosures 618 can be volumes that are exposed from the storage system present in the data analytics appliance 602. The disk enclosures 618 can include multiple virtualized volumes exposed to the upper layers of the data analytics appliance 602. The data analytics appliance 602 can contain multiple physically attached disks which are virtualized by a storage controller cluster (not shown). As there are multiple types of physical disks, they possess different speed and other performance characteristics. Hence, the memories 616 include MTSS managers 620 that place data extents in different tiers of the disk enclosures 618 based on the frequency of access and the number of deduplication links. In this way, more frequently used data can be placed in faster performing tier and hence, thus providing better performance by the applications 606.

Figure 7:
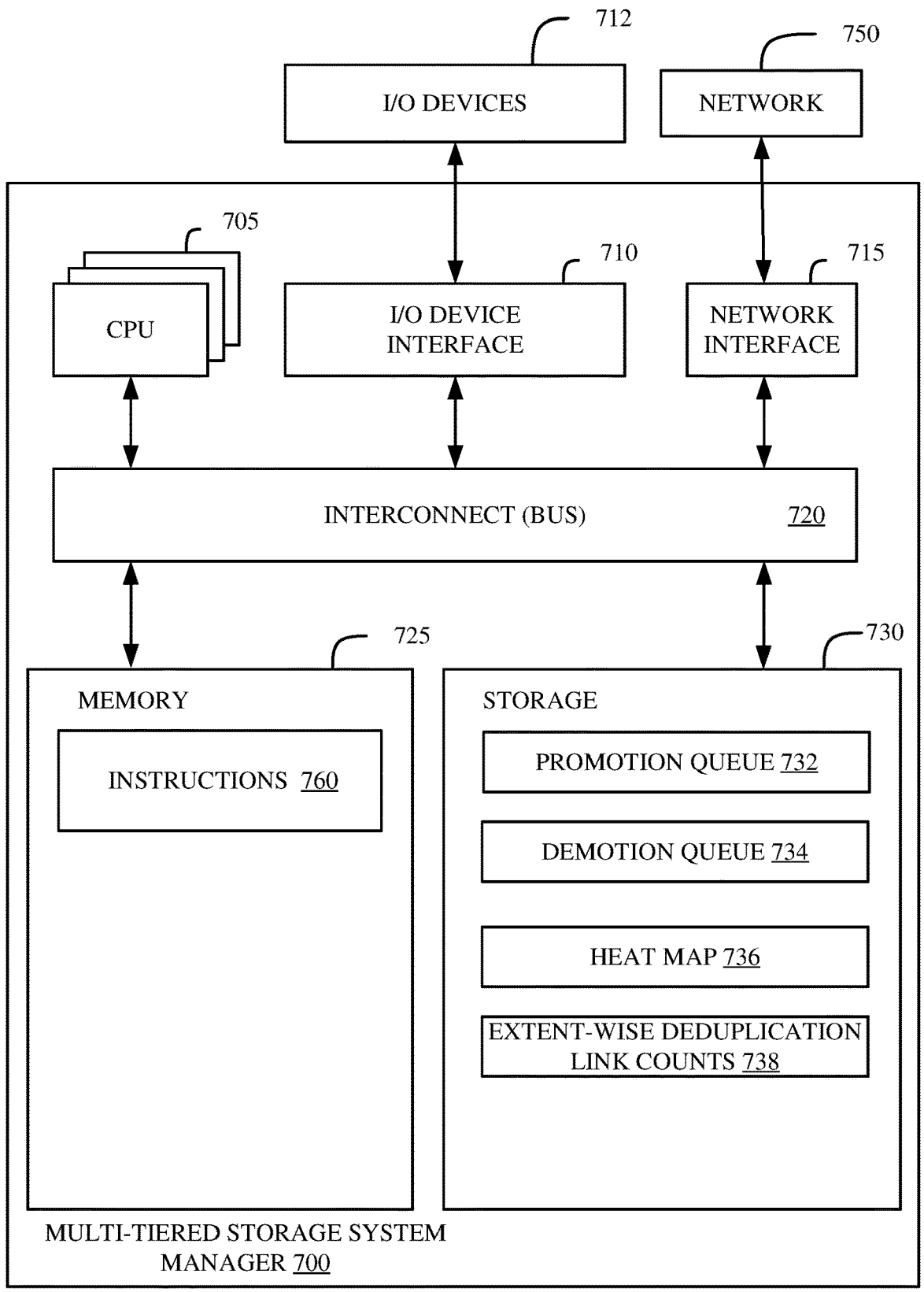
FIG. 7 illustrates a block diagram of an example multi-tiered storage manager, in accordance with embodiments of the present disclosure.

Referring now to FIG. 7, illustrated is a block diagram of an example multi-tiered storage system manager 700, in accordance with embodiments of the present disclosure. In various embodiments, the MTSS manager 700 can perform the method described in FIG. 5 and/or the functionality discussed in FIGS. 1-4 and 6. In some embodiments, the multi-tiered storage system manager 700 provides instructions for the aforementioned methods and/or functionalities to a client machine such that the client machine executes the method, or a portion of the method, based on the instructions provided by the multi-tiered storage system manager 700. In some embodiments, the multi-tiered storage system manager 700 comprises software executing on hardware incorporated into a plurality of devices.

The multi-tiered storage system (MTSS) manager 700 includes a memory 725, multi-tiered storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the multi-tiered storage 730. The interconnect 720 is used to move data, such as programming instructions, between the CPUs 705, I/O device interface 710, multi-tiered storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The multi-tiered storage 730 is generally included to be representative of a non-volatile memory, such as a hard disk drive, solid state device (SSD), removable memory cards, optical storage, and/or flash memory devices. Additionally, the multi-tiered storage 730 can include storage area-network (SAN) devices, the cloud, or other devices connected to the multi-tiered storage system manager 700 via the I/O device interface 710 or a network 750 via the network interface 715.

In some embodiments, the memory 725 stores instructions 760 and the multi-tiered storage 730 stores promotion queues 732, demotion queues 734, a heat map 736, and an extent-wise deduplication link counts 738. However, in various embodiments, the instructions 760, promotion queues 732, demotion queues 734, heat map 736, and extent-wise deduplication link count 738 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all, any of the method of FIG. 5 and/or any of the functionality discussed in FIGS. 1-4 and 6.

Promotion queues 732 and demotion queues 734 can include sorted lists of data extents that are candidates for promotion or demotion to upper or lower storage tiers, respectively. The top tier storage device can be associated with a demotion queue 734, and the lowest tier storage devices can be associated with a promotion queue 732. Intermediate tier storage devices can be associated with both a promotion queue 732 and a demotion queue 734.

The heat map 736 can record the access counts for all the data extents in the multi-tiered storage system. The access counts can represent an average of access counts for all the blocks in a data extent. Additionally, the extent-wise deduplication link counts 738 can record the deduplication link counts for all data extents stored in a multi-tiered storage system.

In various embodiments, the I/O devices 712 include an interface capable of presenting information and receiving input. For example, I/O devices 712 can present information to a user interacting with MTSS manager 700 and receive input from the user.

MTSS manager 700 is connected to the network 750 via the network interface 715. Network 750 can comprise a physical, wireless, cellular, or different network.

In some embodiments, the MTSS manager 700 can be a multi-user mainframe computer system, a single-user system, or a server computer or similar device that has little or no direct user interface but receives requests from other computer systems (clients). Further, in some embodiments, the MTSS manager 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary MTSS manager 700. In some embodiments, however, individual components can have greater or lesser complexity than as represented in FIG. 7, components other than or in addition to those shown in FIG. 7 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
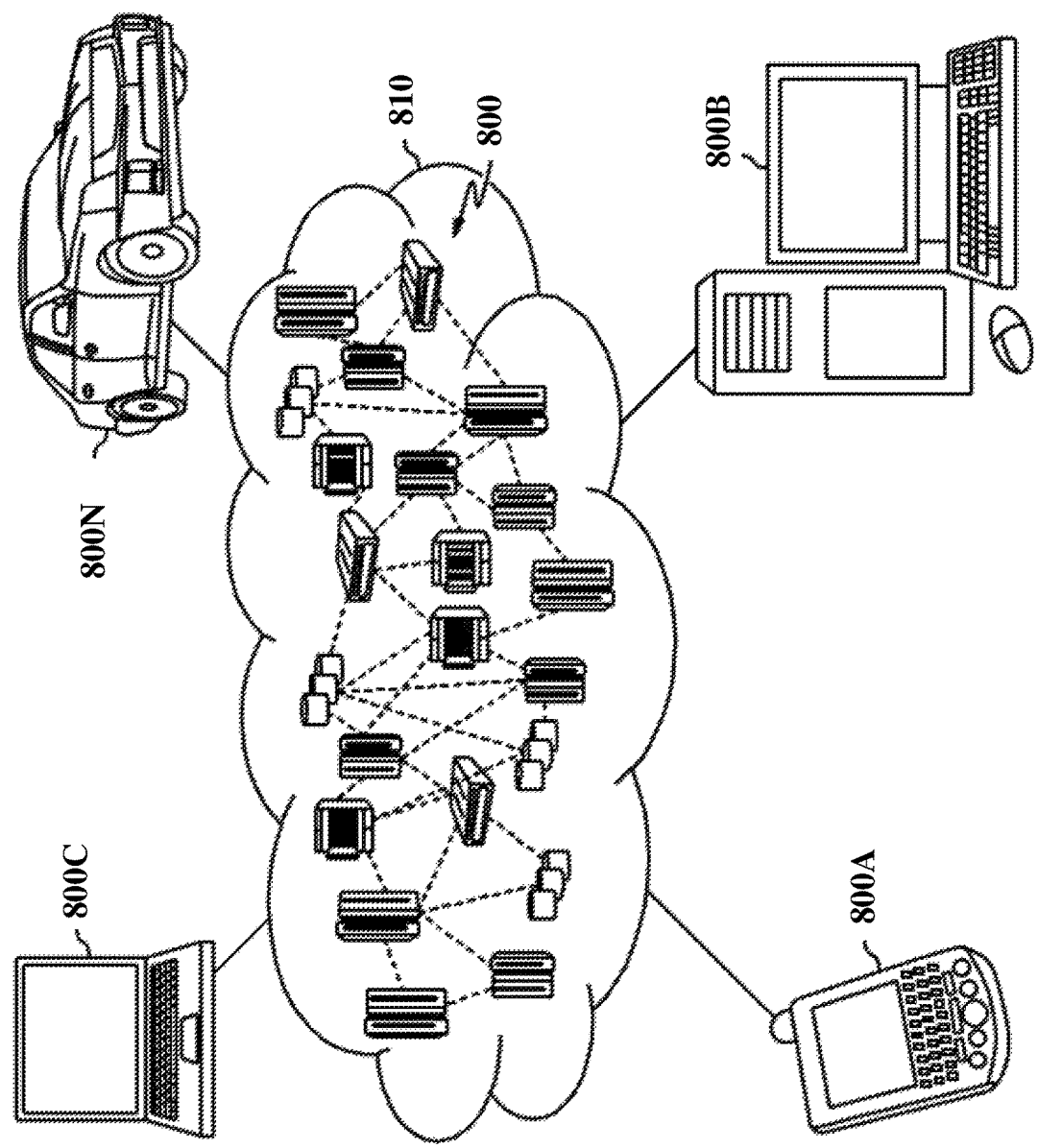
FIG. 8 depicts a cloud computing environment, according to some embodiments of the present disclosure.

Referring now to FIG. 8, which depicts a cloud computing environment 810, according to some embodiments of the present disclosure. As shown, cloud computing environment 810 includes one or more cloud computing nodes 800. The cloud computing nodes 800 can perform the method described in FIG. 5 and/or the functionality discussed in FIGS. 1-4 and 6. Additionally, cloud computing nodes 800 can communicate with local computing devices used by cloud consumers, such as, for example, personal digital assistant (PDA) or cellular telephone 800A, desktop computer 800B, laptop computer 800C, and/or automobile computer system 800N. Further, the cloud computing nodes 800 can communicate with one another. The cloud computing nodes 800 can also be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
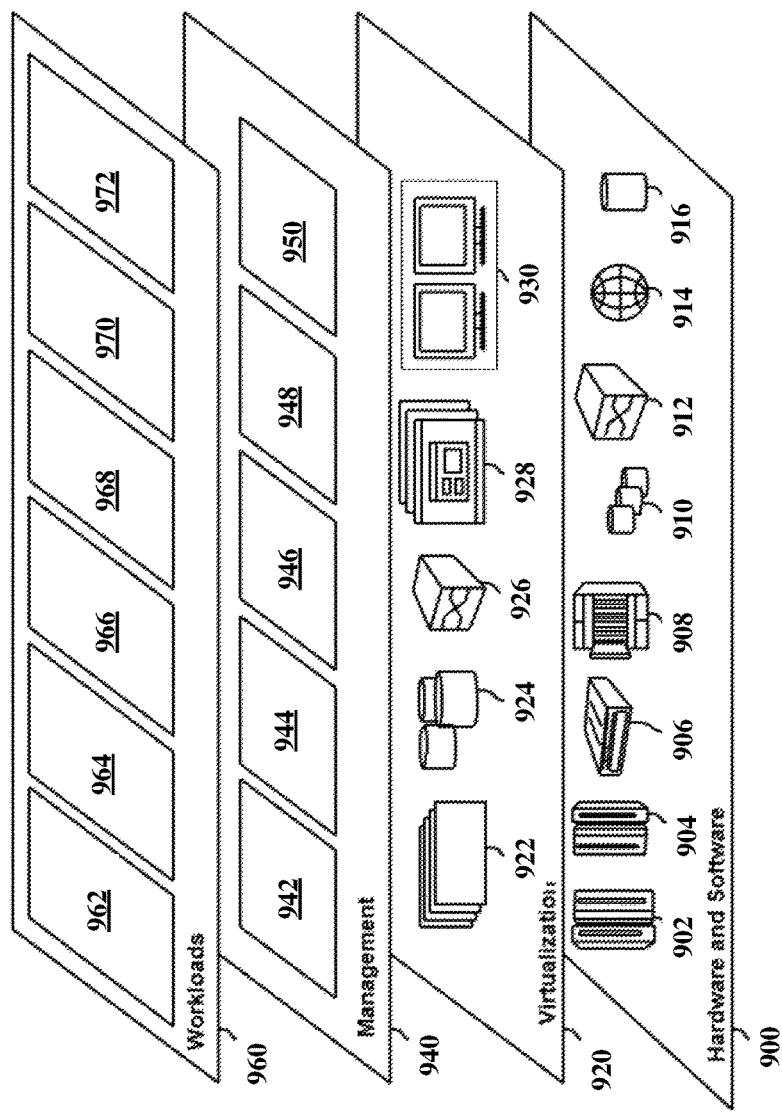
FIG. 9 depicts abstraction model layers, according to some embodiments of the present disclosure.

Referring now to FIG. 9, which depicts abstraction model layers provided by cloud computing environment 810 (FIG. 8), according to some embodiments of the present disclosure. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. Metering and Pricing 944 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service level management 948 can allocate suitable processing power and memory to process static sensor data. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; software development and lifecycle management 964; virtual classroom education delivery 966; data analytics processing 968; transaction processing 970; and multi-tiered storage manager 972.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
generating a heat map for a plurality of data extents in a multi-tier storage system;
generating a queue comprising a plurality of candidates of the data extents by:
determining a plurality of deduplication link counts associated with the candidates;
sorting the candidates based on the heat map; and
sorting the heat map sorted candidates based on the deduplication link counts; and
moving one or more of the candidates from a first tier of the multi-tier storage system to a second tier of the multi-tier storage system based on the queue.

2. The method of claim 1, wherein the first tier has a higher data access speed than the second tier.

3. The method of claim 2, comprising accessing one of the moved candidates from the first tier, wherein the one moved candidate is moved to the first tier instead of an unmoved candidate because the one moved candidate is associated with more deduplication link counts than the unmoved candidate, and wherein the one moved candidate is accessed from the first tier at least one more time than the unmoved candidate is accessed from the second tier.

4. The method of claim 1, wherein the heat map comprises a plurality of data access values for the data extents.

5. The method of claim 1, wherein the deduplication link counts comprise a frequency of deduplication for the data extents.

6. The method of claim 1, wherein determining the deduplication link counts comprises determining application-level deduplication of the candidates.

7. The method of claim 1, wherein determining the deduplication link counts comprises determining storage-level deduplication of the data extents.

8. The method of claim 1, wherein determining the deduplication link counts comprises provisioning an in-bound application program interface (API) and an out-of-bound API for external and internal deduplication detection and address translation mapping for upper level deduplication.

9. The method of claim 1, wherein one of the candidates is deduplicated based on one selected from a group consisting of: a block, a file, and an application.

10. The method of claim 1, wherein the heat map comprises the deduplication link counts.

11. The method of claim 1, wherein the first tier has a lower data access speed than the second tier, and the method comprising accessing one of the moved candidates from the first tier, wherein the one moved candidate is moved to the first tier instead of an unmoved candidate because the one moved candidate is associated with fewer deduplication link counts than the unmoved candidate, and wherein the unmoved candidate is accessed from the second tier at least a same number of times as the one moved candidate is accessed from the first tier.

12. A computer program product comprising program instructions stored on a computer readable storage medium, wherein the computer readable storage medium is not a transitory signal per se, the program instructions executable by a processor to cause the processor to perform a method comprising:
generating a heat map for a plurality of data extents in a multi-tier storage system;
generating a queue comprising a plurality of candidates of the data extents by:
determining a plurality of deduplication link counts associated with the candidates;
sorting the candidates based on the heat map; and
sorting the heat map sorted candidates based on the deduplication link counts; and moving one or more of the candidates from a first tier of the multi-tier storage system to a second tier of the multi-tier storage system based on the queue.

13. The computer program product of claim 12, wherein the first tier has a higher data access speed than the second tier.

14. The computer program product of claim 13, wherein the method comprises accessing one of the moved candidates from the first tier, wherein the one moved candidate is moved to the first tier instead of an unmoved candidate because the one moved candidate is associated with more deduplication link counts than the unmoved candidate, and wherein the one moved candidate is accessed from the first tier at least one more time than the unmoved candidate is accessed from the second tier.

15. The computer program product of claim 12, wherein the first tier has a lower data access speed than the second tier, and the method comprises accessing one of the unmoved candidates from the second tier, wherein the one moved candidate is moved to the first tier instead of an unmoved candidate because the one moved candidate is associated with fewer deduplication link counts than the unmoved candidate, and wherein the unmoved candidate is accessed from the second tier at least a same number of times as the one moved candidate is accessed from the first tier.

16. The computer program product of claim 12, wherein the heat map comprises a plurality of data access values for the data extents and the deduplication link counts comprise a frequency of deduplication for the data extents, and wherein determining the deduplication link counts comprises determining application-level deduplication of the candidates.

17. The computer program product of claim 12, wherein determining the deduplication link counts comprises provisioning an in-bound application program interface (API) and an out-of-bound API for external and internal deduplication detection and address translation mapping for upper level deduplication.

18. The computer program product of claim 12, wherein one of the candidates is deduplicated based on one selected from a group consisting of: a block, a file, and an application.

19. A system comprising:
a computer processing circuit; and
a computer-readable storage medium storing instructions, which, when executed by the computer processing circuit, are configured to cause the computer processing circuit to perform a method comprising:
generating a heat map for a plurality of data extents in a multi-tier storage system;
generating a queue comprising a plurality of candidates of the data extents by:
determining a plurality of deduplication link counts associated with the candidates;
sorting the candidates based on the heat map; and
sorting the heat map sorted candidates based on the deduplication link counts; and
moving one or more of the candidates from a first tier of the multi-tier storage system to a second tier of the multi-tier storage system based on the queue.

20. The system of claim 19, wherein the first tier has a higher data access speed than the second tier, and the method further comprising accessing one of the moved candidates from the first tier, wherein the one moved candidate is moved to the first tier instead of an unmoved candidate because the one moved candidate is associated with more deduplication link counts than the unmoved candidate, and wherein the one moved candidate is accessed from the first tier at least one more time than the unmoved candidate is accessed from the second tier.

* * * * *